MAGNETIC MEMORY CIRCUIT

Filed June 15, 1959

Robert M. Lee
INVENTOR.

BY Byard G. Nilsson
Attorney

United States Patent Office 3,056,948

Patented Oct. 2, 1962

3,056,948

MAGNETIC MEMORY CIRCUIT

Robert M. Lee, Los Angeles, Calif., assignor to The Bendix Corporation, a corporation of Delaware Filed June 15, 1959, Ser. No. 820,252

3 Claims. (Cl. 340—174)

Figures 1, 2:
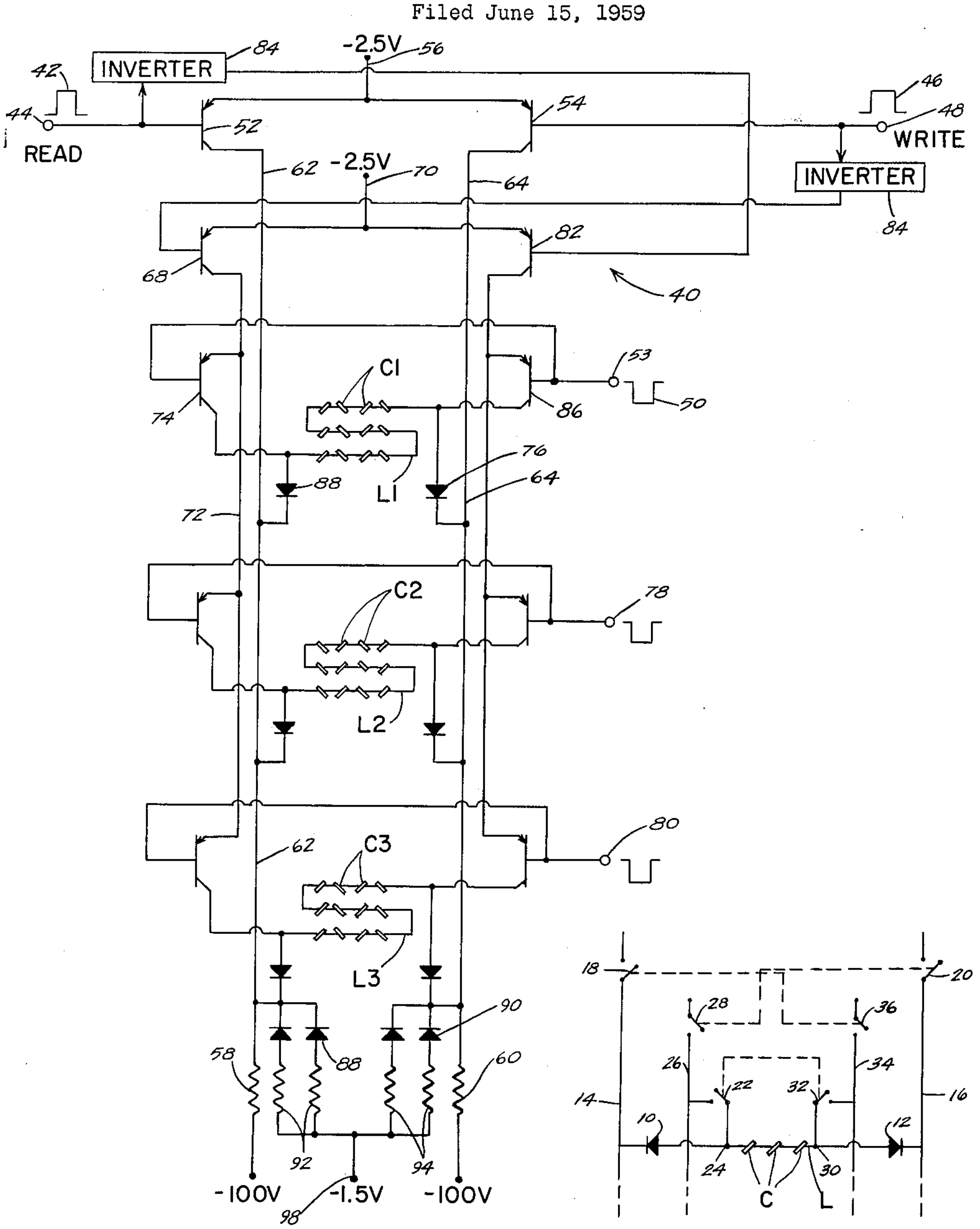

The present invention relates to a static-magnetic memory circuit for variously magnetizing magnetic elements to represent intelligence.

It has been previously proposed to employ magnetic elements having two stable states in a static-magnetic memory system. The magnetic elements are normally formed of material having a generally rectangular hysteresis loop, so that a change in state occurs only when a magnetic element is subjected to a magnetizing force above some predetermined level. This criterion enables the construction of systems wherein selected elements may be changed in state without affecting other elements in the system. For example, the elements may be mounted in a two dimensional array wherein each column and each row is driven by a single electrical conductor; and the state of a selected element may be changed by passing current through the row conductor and the column conductor which link the selected element. As a result of the threshold magnetizing characteristic of the elements, the unselected elements are not affected because the currents in the conductors are not individually great enough to provide the requisite magnetizing force.

Various arrangements have been developed for employing magnetic elements in memory systems, and one such arrangement is shown and described in the Journal of Applied Physics, Volume 22, pages 44 through 48, January 1951.

In general, systems employing magnetic elements to register information, require an electrical circuit to provide magnetizing forces of both polarities to magnetic elements. Of course, various electrical circuits of this type have been proposed; however, a need remains for a simple, fast, and economical electrical circuit for magnetically driving selected groups of magnetic elements.

The present invention provides an electrical system for magnetically driving a selected group of magnetic elements in either polarity, and is proposed for use in a static-magnetic memory system. The electrical system of the present invention includes an electrical conductor for each group of magnetic elements, and four electrical bus lines. The bus lines are variously energized by a switching apparatus depending upon the polarity of magnetism which is to be produced. A second switching apparatus serves to selectively couple the conductors which are linked to the magnetic elements, across the energized bus lines.

Various objects and advantages of the present invention will become apparent from the following detailed description when taken in conjunction with the accompanying drawings, in which:

FIGURE 1 is a diagrammatic representation of a simplified system incorporating the present invention; and FIGURE 2 is a diagrammatic representation of a system incorporating the present invention.

Referring initially to FIGURE 1, there are shown a group of magnetic elements C which may comprise toroidal elements formed of magnetic material having a substantially rectangular hysteresis loop. The elements C have two stable magnetic states and may therefore register information in accordance with the state in which they are placed. That is, depending upon the polarity of magnetization of the element C, these elements may indicate a binary digit.

The elements C are strung upon and magnetically coupled to a conductor L which provides a magnetizing force to the elements. Normally, the elements C in a memory system are coupled to a plurality of conductors. However, to illustrate the present invention, only a single conductor L is shown.

The ends of the conductor L are connected through diodes 10 and 12 to electrical bus lines 14 and 16. The line 14 is connected through a normally-open switch 18 to a source of negative potential. Similarly, the line 16 is connected through a normally-open switch 20 to a source of negative potential.

The conductor L is connected through a normally-open switch 22 from a junction point 24 (between the diode 10 and the elements C) to a bus line 26. The bus line 26 is connected through a normally-open switch 28 to a source of positive potential.

In a similar fashion, a junction point 30 of the conductor L is connected through a normally-open switch 32 to an electrical bus line 34 which is in turn connected through a normally-open switch 36 to a source of positive potential. The switches 18 and 36 are mechanically interconnected, as are the switches 20 and 28, and the switches 22 and 32.

Normally, an operating system incorporating the principles of the present invention would include a plurality of conductors L connected between the electrical bus lines 14, 16, 26 and 34; however, the single electrical conductor L serves to illustrate the principle of operation of the system, which operation will now be considered.

The system of FIGURE 1 is shown in a quiescent state in which no magnetizing force is applied to the cores C. It is to be noted, that none of the sources of potential energizing the system provide any current through the conductor L when the system is in the quiescent state.

In the operation of memory systems incorporating the principles of the present invention, it is often desirable to provide two separate signals to energize a selected conductor. For example, these signals may comprise an "address" signal (identifying the particular conductor to be energized) and a "control" signal (indicating the direction of current flow through the conductor L). Normally, these signals serve to control switches for energizing a selected conductor. In the system of FIGURE 1, the conductor L is energized by the operation of manual switches; however, the sequence of operation for these switches coincides to the signal-controlled sequence described hereinafter.

Assume initially that it is desired to pass an electrical current through the conductor L flowing from right to left. This direction of current flow may be considered to provide a magnetizing force to the elements C which would "write" or register a digit in a magnetic element magnetically coupled to two of the conductors so energized.

The "write" current (flowing from left to right) is established by closure of the switches 20 and 28. The selection of the particular conductor L is accomplished by a closure of the switch 22. Assuming these operations are performed, an electrical current may flow from the positive source of potential through the switch 28, the line 26, the switch 22, the conductor L, the diode 12, the line 16, and the switch 20 to the negative source of potential.

In a similar fashion, the "read" current (flowing from right to left) may be established through the conductor L by closing the switches 36 and 18, and the switch 32. It is to be understood, that the currents flowing through the conductor L provide a magnetizing force of at least one-half the force required to change the state of the elements C. As a result, a magnetic element which is magnetically coupled to two conductors which are energized experiences sufficient magnetizing force to change state if the polarity is correct. Normally, signals are registered in a magnetic element by "write" signals which place a magnetic element in a selected state; and this information sensed from a magnetic element by "read" currents which determine the state of a magnetic element by driving the element oppositely from the "write" currents so that the state of a core is manifest by whether or not the element or core changes state.

Reference will now be had to FIGURE 2, which illustrates a signal-controlled embodiment of the present invention.

FIGURE 2 includes a plurality of conductors L1, L2, and L3, which are magnetically coupled respectively to groups of magnetic elements or cores C1, C2, and C3. The apparatus employed to energize each of the conductors L1, L2, and L3 with an electrical current flowing in either direction, is similar; therefore, only the apparatus employed to control the conductor L1 is described in detail.

The determination of the operation to be performed, i.e. read or write, is controlled by a control circuit generally indicated at 40. Application of a pulse 42 at a terminal 44 results in current flow through a selected one of the conductors L1, L2, or L3, which may serve to reset the state of certain cores and thereby sense or read the content of the cores as described above.

The application of a pulse 46 to a terminal 48 of the control circuit 40, results in a current through a selected one of the conductors L1, L2, or L3, in the opposite direction from that considered above whereby to record or write information into the cores.

A particular group of cores C1, C2, or C3 is selectively controlled by energizing a selected one of the conductors L1, L2, or L3 by applying a pulse, as the pulse 50, to an input terminal, as the input terminal 53, in time coincidence with either the pulse 42 or the pulse 46.

The operation of the system of FIGURE 2 may now best be considered by assuming various states of the system and introducing the component parts of the system as the explanation of operation proceeds. Initially the system is assumed to be in a quiescent state.

A pair of transistors 52 and 54 are indicated at the top of FIGURE 2, and the emitter electrodes of these transistors are connected to a source of low negative potential applied at a terminal 56. The base electrodes of the transistors 52 and 54 are connected respectively to the terminals 44 and 48. The collector electrodes of the transistors 52 and 54 are connected through resistors 58 and 60 respectively to a source of relatively high negative potential. The transistors 52 and 54 are biased to pass an emitter-collector current in the absence of the pulses 42 and 46. Therefore, during the quiescent state of the system, one electrical current flows through the transistor 52, a bus line 62 and the resistor 58 maintaining the bus line 62 at a relatively low negative voltage. Similarly, a current flows from the terminal 56 through the transistor 54, a bus line 64 and the resistor 60 to thereby maintain the bus line 64 at a low voltage.

During the quiescent state of the system, only the transistors 52 and 54 conduct electrical currents and as a result the conductors L1, L2 and L3 are electrically isolated from all current sources but the bus lines 62 and 64. These lines 62 and 64 are at equal potential and therefore no current flows through the conductors L1, L2 or L3 during the quiescent state.

Upon the application of a "write" pulse 46 to the terminal 48, the transistor 54 is cut off. The pulse 46 is inverted by an inverter 66 and applied to drive a transistor 68 into conduction. The emitter electrode of the transistor 68 is connected to a low voltage source applied at a terminal 70 while the collector electrode is connected through a bus line 72 to the emitter electrodes of switching transistors associated with each of the conductors L1, L2 and L3. The conductor L1 is connected to the collector electrode of a switching transistor 74, which has a base electrode connected to the terminal 53.

The application of a negative form of the pulse 46 to the base of the transistor 68 drives the transistor 68 into conduction so that upon the occurrence of the pulse 50 at the terminal 53, current may pass from the terminal 70 through the transistor 68, the transistor 74, the conductor L1, and a diode 76 to the bus line 64 and then through the resistor 60 to the source of negative potential. This left-to-right current through the conductor L1 comprises one of the component currents to form a magnetizing force for recording information in the cores C1. Of course, the cores C1 may comprise a single row or column of cores in an array each of which is similarly linked by another conductor similar to the conductor L1 for selective magnetization as described above.

The groups of cores C2 and C3 may be driven in a manner described above with respect to the cores C1 by applying pulses to the terminals 78 or 80 (associated with these cores) in coincidence with the pulse 46.

The operation of sensing information from a selected group of cores, as the cores C1 is performed by simultaneous application of pulses 42 and 50 at the terminals 44 and 53 respectively. The pulse 42 cuts off the transistor 52 and drives a transistor 82 into conduction through an inverter 84. Thereafter, application of the pulse 50 to the terminal 53 enables the current to flow from the terminal 70 through the transistor 82, a transistor 86 (connected in parallel with the transistor 74 for control by the pulse 50), the conductor L1, a diode 88, line 62 and the resistor 58. It is to be noted that the diode 76 does not pass a current during this interval because the line 64 is held at a relatively low negative potential which nearly coincides to the potential of the conductor L1.

From the above consideration, it is apparent that the present invention may be incorporated in a simple system including four bus lines which are selectively energized by a simple switching apparatus to permit currents in either direction to be selectively passed through a number of core-driving conductors.

At the bottom of FIGURE 2, first and second pairs of diodes 88 and 90 are connected in parallel from the bus lines 62 and 64 respectively through resistors 92 and 94 to a source of relatively-low negative potential applied to the terminal 98. This circuit comprises a protective device in the event of transistor failure. For example, failure of the transistors 52 or 54 results in the application of a high negative voltage to the collector electrodes of the transistors as transistor 74. This voltage may be below the breakdown level of these transistors. To prevent such an occurrence, the diodes 88 and 90 carry a current maintaining the potential of the bus line 62 above a safe level. The diodes 90 and resistors 94 function in a similar fashion with respect to the bus line 64.

It should be noted that although the particular embodiment of the invention herein shown and described is fully capable of providing certain advantages, such embodiment is merely illustrative of this invention and therefore modifications and changes may be made thereto without departing from the spirit of the invention or the scope of the following claims.

What is claimed is:

1. In an electrical system wherein a plurality of groups of magnetic elements are subjected to magnetic fields to register information, a driving system for selectively providing magnetizing force of either polarity to each of said groups, comprising: a plurality of conductors, each magnetically coupled to one of said groups of magnetic elements; first, second, third and fourth bus lines; a plurality of first unilateral conducting means, individually connected between one end of said conductors and said first bus line to permit current flow through said conductors in one direction; a plurality of second unilateral conducting means individually connected between the other end of said conductors and said fourth bus line to permit current flow through said conductors in another direction; means for selectively exclusively energizing said first and third conductors, and said second and fourth conductors with a potential difference; and switch means for selectively connecting the ends of said conductors to said second and third bus lines respectively whereby a current flows through a selected conductor in a direction depending on the bus lines energized.

2. Apparatus according to claim 1 wherein said switch means comprise a pair of transistor switches controlled by a common signal.

3. Apparatus according to claim 1 wherein said means for exclusively energizing comprise transistor switches connected between said bus lines and a source of potential, and controlled in pairs by common signals.

References Cited in the file of this patent

UNITED STATES PATENTS

| | | |
|---|---|---|
| 2,840,801 | Beter | June 24, 1958 |
| 2,931,015 | Bonn et al. | Mar. 29, 1960 |

FOREIGN PATENTS

| | | |
|---|---|---|
| 769,384 | Great Britain | Mar. 6, 1957 |
| 787,905 | Great Britain | Dec. 18, 1957 |